(12) United States Patent
Needham

(10) Patent No.: US 6,497,244 B2
(45) Date of Patent: Dec. 24, 2002

(54) FLUID FLOW PROPORTIONING DEVICE

(76) Inventor: David Needham, 21 Broomfield Ave., Hasland, Chesterfield, S41 0LU (GB)

(*) Notice: Subject to any disclaimer, the term of this patent is extended or adjusted under 35 U.S.C. 154(b) by 46 days.

(21) Appl. No.: 09/784,680

(22) Filed: Feb. 15, 2001

(65) Prior Publication Data

US 2001/0039969 A1 Nov. 15, 2001

(30) Foreign Application Priority Data

Mar. 2, 2000 (GB) .............................................. 0004949

(51) Int. Cl.[7] .............................................. G05D 11/03
(52) U.S. Cl. ........................ 137/98; 137/92; 137/628; 251/214
(58) Field of Search ............................. 137/88, 92, 98, 137/99, 628; 251/214

(56) References Cited

U.S. PATENT DOCUMENTS

| | | |
|---|---|---|
| 4,209,040 A | 6/1980 | Peters |
| 4,274,432 A | 6/1981 | Tunstall et al. |
| 4,340,204 A | 7/1982 | Herd |
| 4,363,465 A | 12/1982 | Morrill |
| 4,364,542 A | 12/1982 | Meyer |
| 4,468,039 A | 8/1984 | Le et al. |
| 4,538,919 A * | 9/1985 | Bohnensieker ............ 137/98 |
| 4,565,511 A * | 1/1986 | Ramisch .................. 137/98 |
| 4,575,101 A | 3/1986 | Hopkins |
| 4,609,506 A * | 9/1986 | Berglund ................ 137/894 |
| 4,633,895 A * | 1/1987 | Eberhardt ................ 137/98 |
| 4,640,305 A | 2/1987 | Johnson |
| 4,886,241 A | 12/1989 | Davis et al. |
| 5,056,757 A | 10/1991 | Wood |
| 5,121,855 A * | 6/1992 | Credle, Jr. ................ 137/99 |
| 5,129,625 A | 7/1992 | Wood et al. |
| 5,238,252 A | 8/1993 | Stewen et al. |
| 5,253,679 A | 10/1993 | Pacht |
| 5,492,150 A | 2/1996 | Aquilino |
| 5,593,166 A | 1/1997 | Lovell et al. |
| 5,908,046 A | 6/1999 | Mosman |

FOREIGN PATENT DOCUMENTS

| | | |
|---|---|---|
| EP | 0198975 | 10/1986 |
| EP | 0422342 | 4/1991 |
| GB | 109576 | 9/1917 |
| GB | 529042 | 11/1940 |
| GB | 777039 | 6/1957 |
| GB | 817873 | 8/1959 |
| GB | 974190 | 11/1964 |
| GB | 1053971 | 1/1967 |
| GB | 1222280 | 2/1971 |
| GB | 1292700 | 10/1972 |
| GB | 1303022 | 1/1973 |
| GB | 1344597 | 1/1974 |
| GB | 1490661 | 11/1977 |
| GB | 2058247 | 4/1981 |
| GB | 2103310 | 2/1983 |
| GB | 2122727 | 1/1984 |
| GB | 2152599 | 8/1985 |
| GB | 2231125 | 7/1990 |
| GB | 2233405 | 1/1991 |
| GB | 2266576 | 11/1993 |
| GB | 2325457 | 11/1998 |
| WO | WO 9529354 | 11/1995 |

* cited by examiner

Primary Examiner—John Rivell
Assistant Examiner—Ramesh Krishnamurthy
(74) Attorney, Agent, or Firm—Trexler, Bushnell, Giangiorgi, Blackstone & Marr, Ltd.

(57) ABSTRACT

A fluid flow proportioning device including spool type valve elements (12,14,16) opposite end portions of which reciprocate in oppositely disposed and spaced apart valve block halves (100,102). So that the fluids being proportioned can never mix within the device despite the spool portions being devoid of sealing element within the cylindrical bores (13, 15,17) in which they are slideable, central portions (21) of the valve elements are of smaller diameter than the diameters of the cylindrical bores (13,15,17) in which the valve elements are located, and resilient seals (105) encircle the portions (21) where they extend outwards from the valve block halves.

9 Claims, 15 Drawing Sheets

FLUID FLOW PROPORTIONING DEVICE

FIELD OF THE INVENTION

The invention relates to a positive displacement fluid flow proportioning device.

Fluid flow proportioning devices are required, for example, where a two-part mixture of materials is to be used for spraying a coating on metal sheets or within a metal pipeline. In such cases, the materials concerned may well be a cold setting resin material mixed with a liquid curing agent or initiator and, if so, it will be vital that the materials are mixed together in precisely the correct proportions. However, variations of temperature (and thus the viscosities of the materials concerned) as the operation proceeds can make the maintenance of the correct proportions in this particular situation very difficult indeed. In other industrial situations, for example in the manufacture of foodstuffs and pharmaceuticals, where liquids or gases are to be mixed together in exact proportions, other variables can make the maintenance of the ideal mix equally difficult.

A further difficulty in this and other situations where the materials to be mixed are particularly aggressive, for example of an abrasive nature, is that any resilient sealing means required are prone to severe wear, so much so that their frequent replacement to ensure the proper functioning of the proportioning device can make the operation uneconomic.

The object of the invention is to provide a simple fixed-ratio and relatively inexpensive fluid flow proportioning device whereby fluids can be divided accurately into two or more flows which are in some required fixed proportion to each other.

SUMMARY OF THE INVENTION

According to the invention, there is provided a fluid flow proportioning device including at least three spool type valve elements slidably located in respective cylindrical bores to which there is connected a common inlet passage for a first fluid flow under pressure, by way of respective inlet ports, a common inlet passage for a second fluid flow under pressure, by way of other respective inlet ports, respective outlet ports being spaced from the inlet ports and respective transfer ports being provided whereby, in response to sequential movements of the valve elements, one of a pair of pressure chambers at the opposite ends of each valve element is fed in turn with one of the two fluid flows under pressure admitted via one of the two transfer ports of the previously actuated element whilst a measured volume of the other fluid flow is discharged, by the movement of the respective valve element, from the other of the pair of pressure chambers via the other transfer port of the previously actuated element, whereby, as the valve elements are actuated in turn, the proportions of the two fluid flows being delivered for use are dependent on the number of pressure chambers for each fluid flow which are connected for use, the respective cylindrical bores in which the valve elements are slidably located being formed in oppositely disposed and spaced apart valve block halves, and central portions of the spool type valve elements being of relatively small diameter, that is to say smaller than the diameters of the cylindrical bores in which the spool type valve elememts are slidably located, and being provided with resilient seals where they extend outwards from the valve block halves. Each spool type valve element may be constituted by two opposite end portions and a central push-rod portion abutting together end to end. Means may be provided for intensifying pressure on the resilient seals which surround the central portions of the spool type valve elements. Provision may be made for any leakage of fluid past a valve element in a cylindrical bore of a valve block half to be ducted back to a respective holding tank for the fluid concerned. Respective baffle plates may be mounted on the central portions of said valve elements to prevent the mixing together of any leakage of fluids past the resilient seals where such mixing could be either dangerous or inconvenient.

The arrangement may be such that, in operation of the device, the pressure of one fluid flow causes movements of the spool type valve elements, in turn, in one direction and the pressure of the other fluid flow then causes movements of said elements, in turn, in the opposite direction. Alternatively, the arrangement may be such that the pressures of the two fluid flows are effective alternately, that is to say, when the pressure of one fluid flow has caused the movement of one valve element in one direction, the pressure of the other fluid flow then causes the movement of a next valve element in the opposite direction, and so on, this resulting in a smoother fluid output from the device.

The first and second fluid flows may be of different fluids and may be at different pressures, the device operating to control the flow of the respective fluids in some fixed proportion to each other, possibly for mixing together at some fixed ratio.

Alternatively, the first and second fluid flows may be taken from a single fluid supply, the device operating to divide the fluid into at least two flows in some fixed proportion to each other. If the device is to control the flow of two different fluids at different pressures, the opposite ends of the valve elements may be of different diameters to compensate for the differences of pressure; to compensate for such different diameters, that is to say to ensure that the same volume of fluid is displaced on each movement of a valve element, each valve element may be constituted by a pair of valve halves arranged to move through different distances, that is to say, being linked together for simultaneous movement by means which control the stroke of each valve half in inverse proportion to its cross-sectional area.

BRIEF DESCRIPTION OF THE DRAWINGS

FIGS. 15 and 16 are schematic views which illustrate further possible modifications which will be referred to.

DESCRIPTION OF THE PREFERRED EMBODIMENT

Figure 1:
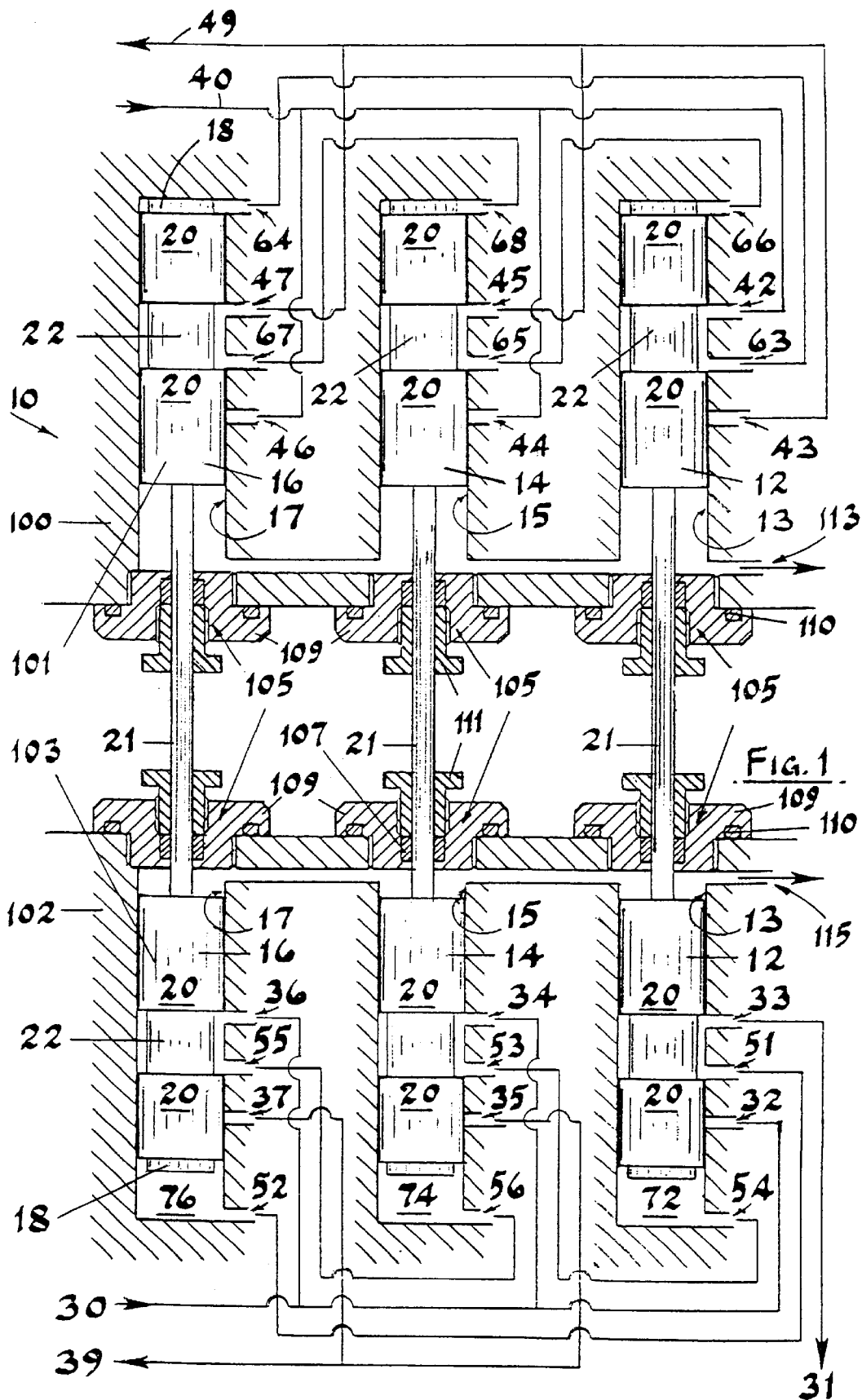
FIGS. 1 to 6 are schematic views which illustrate the sequence of operations of a device embodying the invention.

Referring now to FIGS. 1 to 6 of the drawings, the proportioning device there illustrated includes a valve block generally indicated 10 and formed in two spaced halves 100 and 102, the valve block containing three spool type valve elements 12,14 and 16 located in parallel in respective cylindrical bores 13,15 and 17 each of which extends co-axially into the rigidly spaced apart valve block halves. Each spool type valve element is double ended, that is to say has a short spigot portion 18 at each end, and lands 20, 20 separated by spindle portions 22. The two end portions of each valve element, that is to say those portions which are slidably located in the respective cylindrical bores of the valve block halves (and which in FIG. 1 are generally indicated 101 and 103) are formed separately and spaced apart by central push-rod portions 21, these being of relatively small diameter, that is to say very much smaller in diameter than the portions which are a sliding fit in the cylindrical bores. (It will be understood that, although the end portions of the valve elements simply abut against the opposite ends of the push-rod portions, since throughout the operation of the apparatus hydraulic pressure constantly holds them together, it is for purposes of simple illustration convenient to regard the pairs of end portions and respective push-rod portions as three spool type valve elements 12, 14 and 16, and they will henceforth be referred to in this way. The valve elements must be able to reciprocate freely in their respective bores, as will presently be described, during the operation of the apparatus; forming the opposite end portions and push-rod portions of the valve elements separately, so that they abut together, guards against the danger of any slight misalignment of the cylindrical bores causing resistance to movement or even jamming of the valve elements in their bores as they reciprocate).

The opposite end portions of the spool type valve elements are a very close sliding fit within their respective bores but are devoid of any kind of sealing means therein. However, it will be seen that the outer ends of the cylindrical bores 13, 15 and 17 are counterbored and screwthreaded to receive annular closure caps 109 through which the push rod portions of the valve elements extend; sealing means generally indicated 105 are provided within the closure caps.

The sealing means, generally indicated 105, for sealing the apertures through which the push-rod portions are slidable, include annular plugs 107 of a resilient material located in counterbored portions of the closure caps. Respective annular screw members 111 are located in screwthreaded portions of the closure caps and bear against the annular plugs 107 to force the latter into fluid-tight engagement with the cylindrical surfaces of the push-rod portions, the pressure of the annular plugs against the surfaces of the push-rod portions being dependent on the degree of tightening of said plugs. The closure caps are themselves sealed against the surfaces of the valve block halves by respective O-ring seals 110.

Referring now to the hydraulic connections depicted in FIGS. 1 to 6, into each cylindrical bore 13, 15 and 17 of the valve block half 102 there is connected a common inlet passage 30, for a first fluid under pressure, by way of respective inlet ports 32, 34 and 36. There is connected into each bore 13, 15 and 17 of the valve block half 100 a common inlet passage 40, for a second fluid under pressure, by way of respective inlet ports 42, 44 and 46. Respective outlet ports 33, 35, 37 for the first fluid and 43, 45, 47 for the second fluid are spaced from the inlet ports referred to. The outlet ports 43, 45 and 47 are connected to a common outlet passage 49. In contrast to this, the single outlet port 33 communicates with an outlet passage 31 whilst outlet ports 35 and 37 communicate with a common outlet passage 39.

Midway between adjacent inlet and outlet ports there are respective transfer ports 51, 53, 55 and 63, 65, 67 which, as shown, communicate with adjacent ends of successive bores, that is to say, transfer port 51, opening from bore 13, communicates with a port 52 which opens from one end of bore 17; transfer port 53, opening from bore 15, communicates with a port 54 which opens from one end of bore 13; transfer port 55, opening from bore 17, communicates with a port 56 which opens from one end of bore 15; transfer port 63, opening from bore 13, communicates with a port 64 which opens from the other end of bore 17; transfer port 65, opening from bore 15, communicates with a port 66 which opens from the other end of bore 13; and transfer port 67, opening from bore 17, communicates with a port 68 which opens from the other end of bore 15.

In operation of the device, the fluid pressures in the common inlet passages 30 and 40 act to cause reciprocating movements of the valve elements 12, 14 and 16, the pressure of one fluid causing movements of said valve elements, in turn, in one direction and the pressure of the other fluid then causing movements of said elements, in turn, in the opposite direction. The pressure chambers at the opposite ends of each valve element are fed in turn with one of the two fluids under pressure via one of the two transfer ports of the previously actuated element whilst the same volume of the other fluid is discharged, by the movement of the respective valve element, from the other of the pair of pressure chambers via the other transfer port of the previously actuated element, a movement of each valve element triggering a movement of the next successive element. Throughout the operation of the device, the volumes of fluid which displace the valve elements through the precise distances which they move are exhausted into the respective outlet passages on their return movements. The collective quantities of fluid exhausted to the outlet passages are therefore in direct proportion to the number of outlet ports communicating with the outlet passages concerned. The proportions of the two fluids being delivered for use will be dependent on the number of pressure chambers for each fluid which are connected for use; those which are not connected for use may be connected back to a storage tank concerned.

The sequence of movements of the spool type valve elements during the operation of the apparatus is illustrated in FIGS. 1 to 6.

Referring to these in turn:

FIG. 1 illustrates an instant in the sequence in which all of the valve elements are located at the upper ends of their bores. In this position, the pressure of fluid in the inlet passage 30 is ineffective because inlet port 32 is blanked off and although inlet ports 34 and 36 are open they lead via ports 53, 54 and 55, 56 to pressure chambers 72, 74 which are already filled with fluid. (The pressure chamber 76 beneath valve element 16 is also filled with fluid). The pressure of fluid in the inlet passage 40 is, however, effective because, although inlet ports 44 and 46 are blanked off, inlet port 42 is open and communicates via ports 63, 64 with the upper end of valve element 16. Consequently, this effects the downward movement of the valve element 16 and the discharge of the fluid (that is to say, a volume of the first fluid) in the pressure chamber 76 beneath it through outlet passage 31 via ports 52, 51 and 33.

Figure 2:
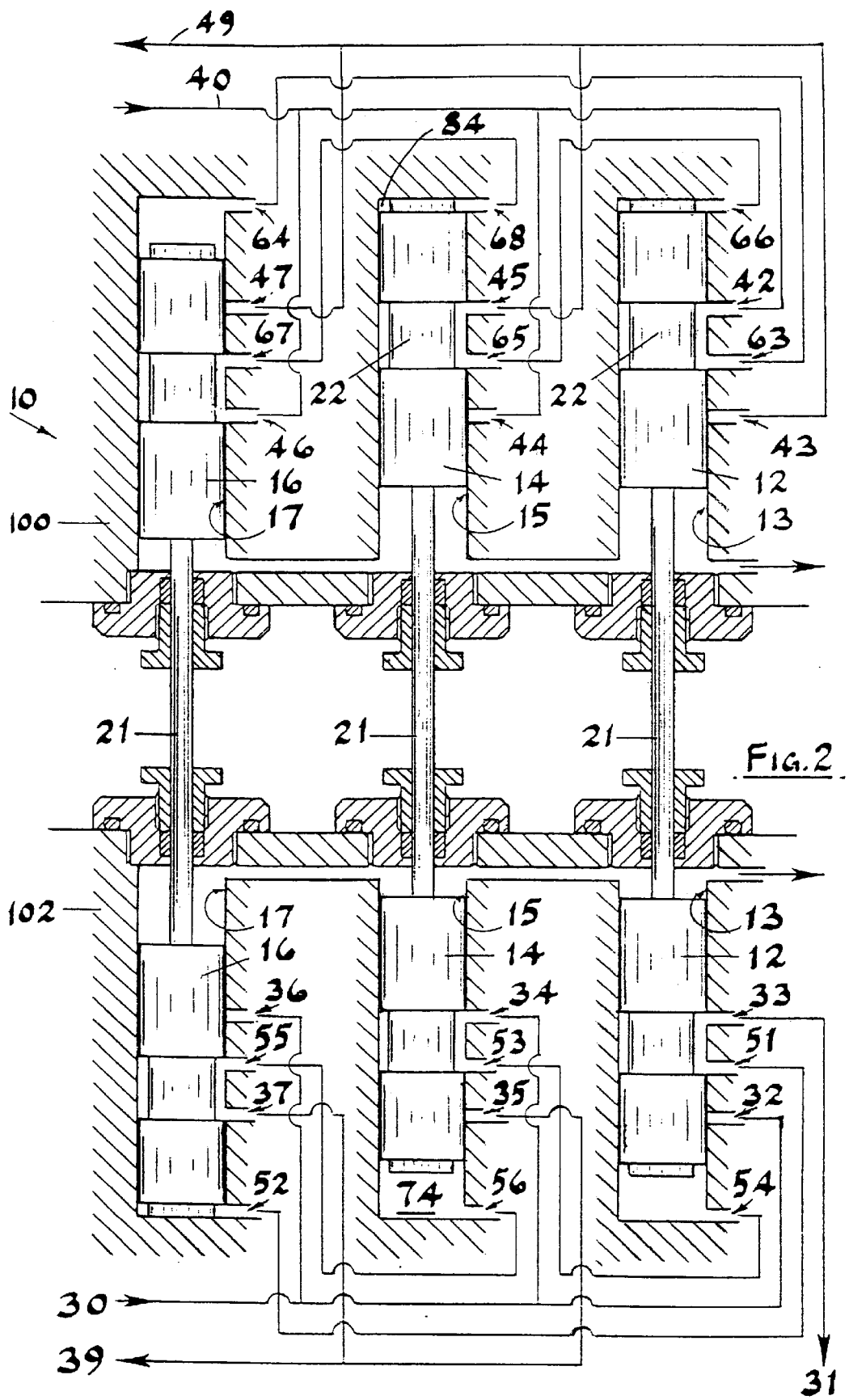

FIG. 2 shows that downward movement of valve element 16 has opened inlet port 46 so that inlet passage 40 communicates, via ports 67, 68 with the pressure chamber 84 at the upper end of valve element 14; this causes valve element 14 to move downwardly to displace the fluid (again a volume of first fluid) in pressure chamber 74 through outlet passage 39 via ports 56, 55 and 37.

Figure 3:
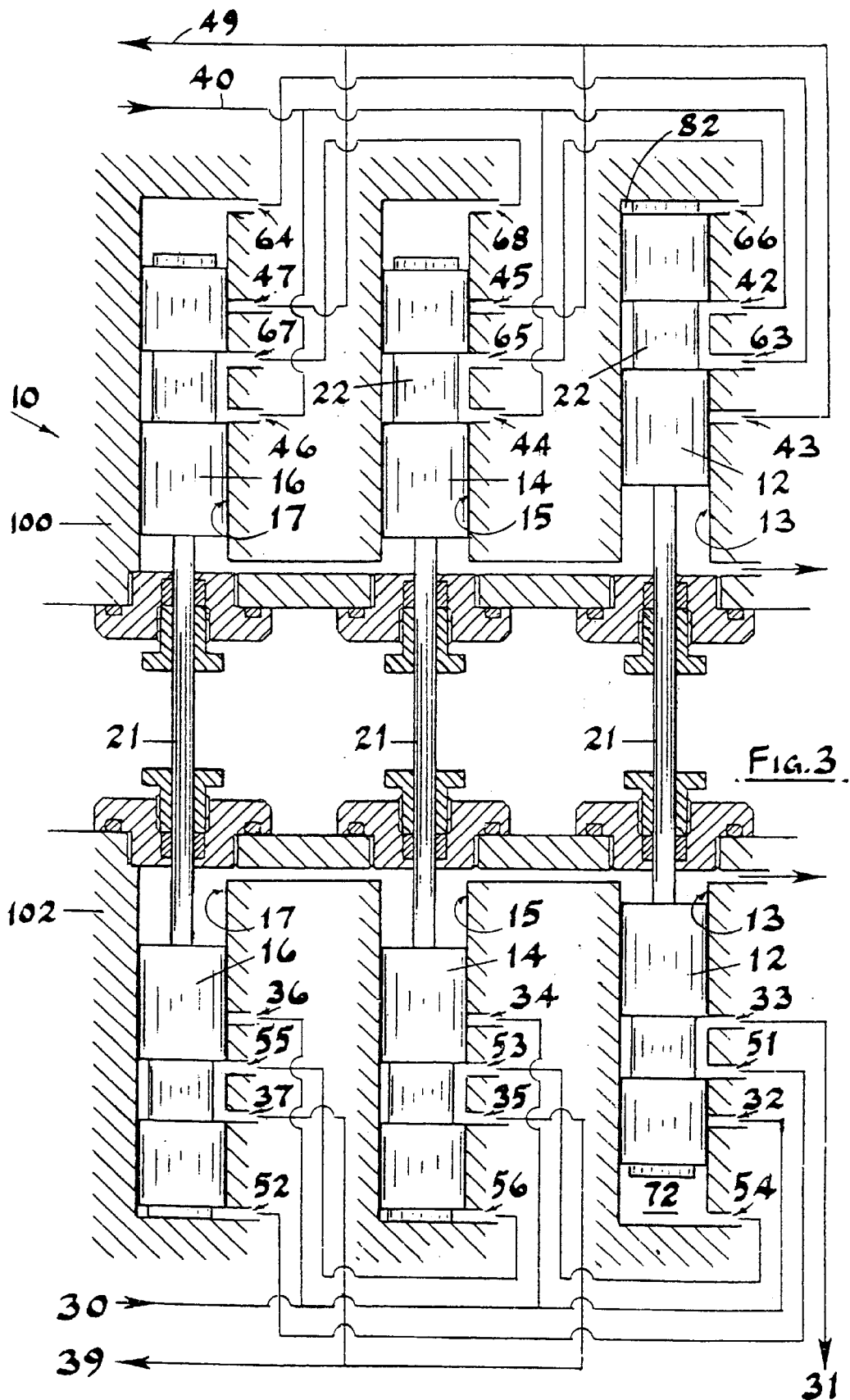

FIG. 3 shows that downward movement of valve element 14 has opened inlet port 44 so that inlet passage 40 communicates, via ports 65, 66, with the pressure chamber 82 at the upper end of valve element 12; this causes valve element 12 to move downwardly to displace the volume of fluid (again a volume of first fluid) in pressure chamber 72 through outlet passage 39 via ports 54,53 and 35.

Figure 4:
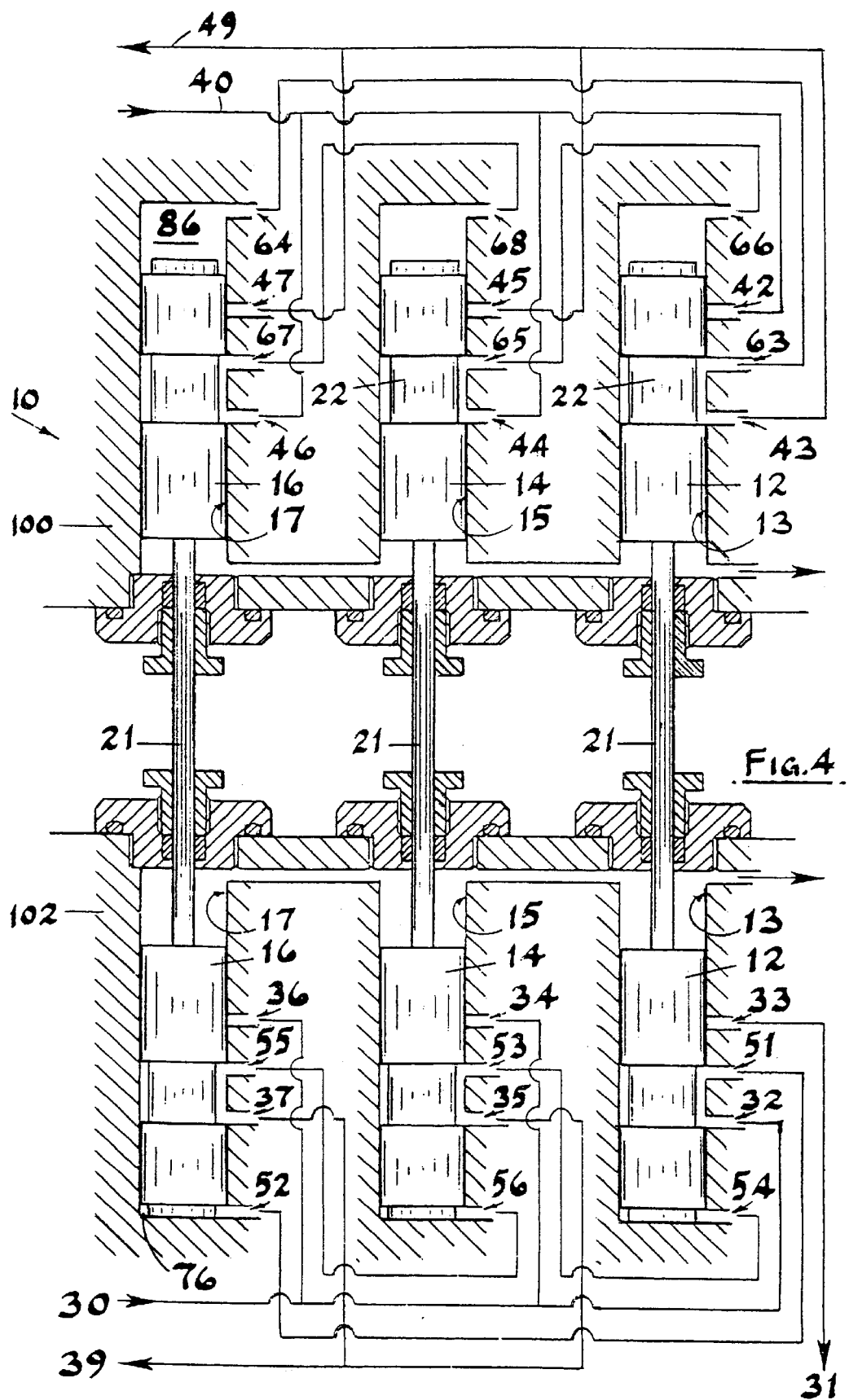

FIG. 4 shows that downward movement of valve element 12 has opened inlet port 32 so that inlet passage 30 communicates, via ports 51,52, with the pressure chamber 76 at the lower end of valve element 16; this causes valve element 16 to move upwardly to displace the volume of fluid (that is to say, a volume of second fluid) in pressure chamber 86 through outlet passage 49 via ports 64,63 and 43.

Figure 5:
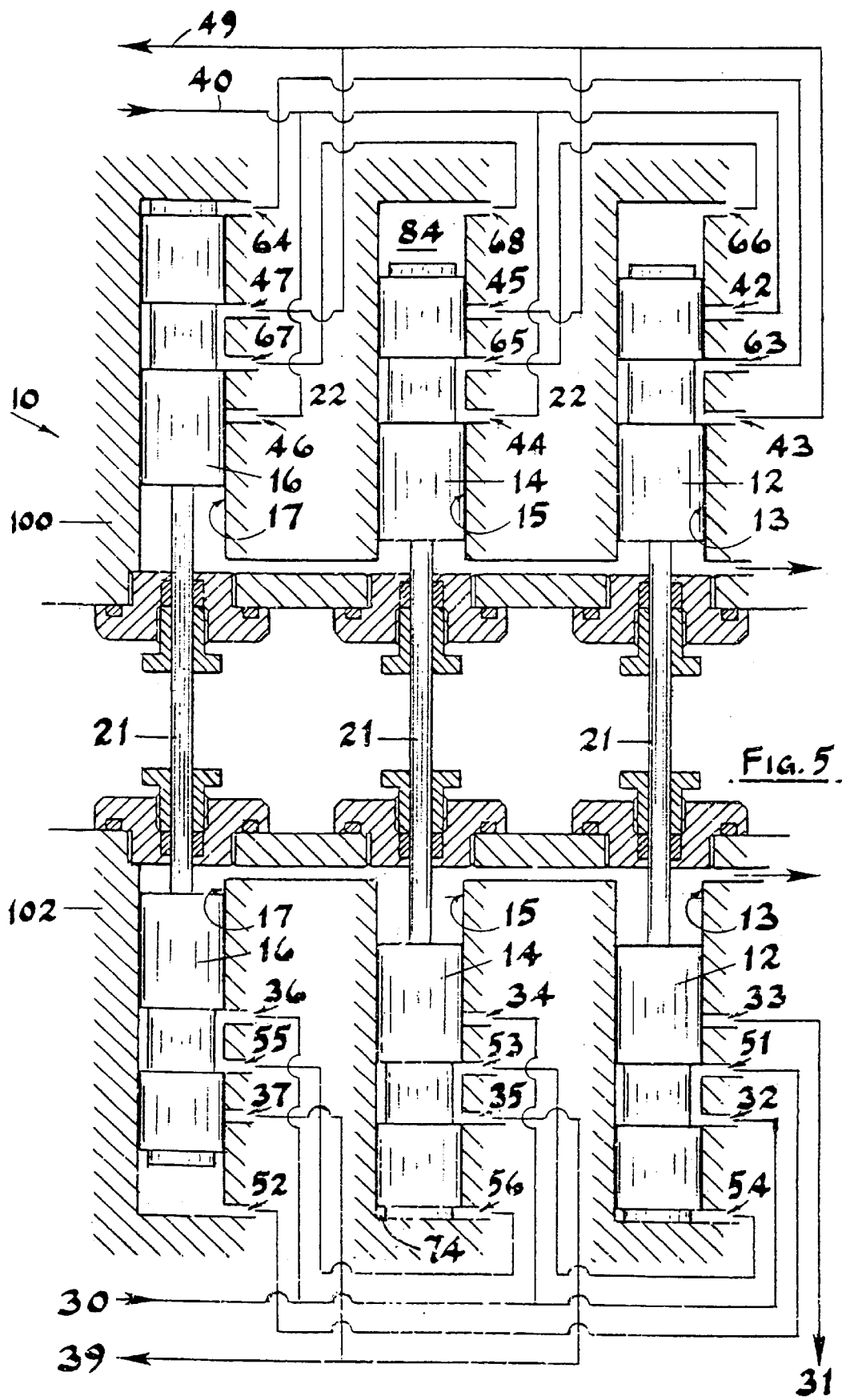

FIG. 5 shows that upward movement of valve element 16 has opened inlet port 36 so that inlet passage 30 communicates, via ports 55,56, with the pressure chamber 74 at the lower end of valve element 14; this causes valve element 14 to move upwardly to displace the volume of fluid (again a volume of second fluid) in pressure chamber 84 through outlet passage 49 via ports 68,67 and 47.

Figure 6:
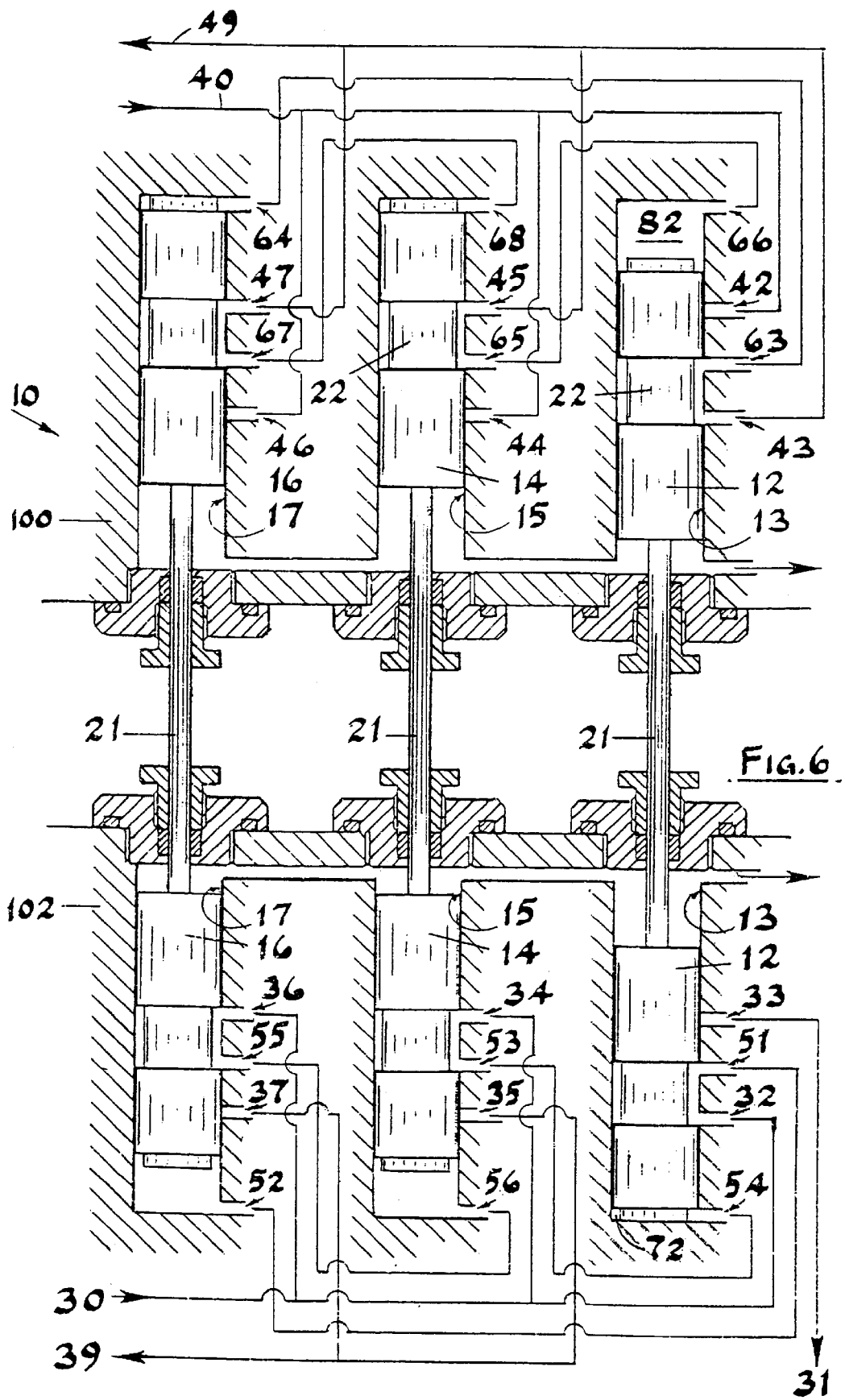

FIG. 6 shows that upward movement of valve element 14 has opened inlet port 34 so that inlet passage 30 communicates, via ports 53,54, with the pressure chamber 72 at the lower end of valve element 12; this causes the valve element 12 to move upwardly to displace the volume of fluid (again a volume of second fluid) in pressure chamber 82 through outlet passage 49 via ports 66,65 and 45, and returns the device to the condition illustrated in FIG. 1.

It will be understood that since the outlet ports 43,45 and 47 are all connected to the outlet passage 49, so that the latter receives the full flow of fluid passing through inlet passage 40, whereas the exhaust of fluid which has passed through inlet passage 30 is split in the ratio 2:1 between outlet passages 39 and 31, the available proportioning of the two fluids is either 1:0.666 or 1:0.333 depending on which of the two outlet passages 39 and 31 is connected back to the storage tank concerned, the other being used for mixing with the full flow of fluid having passed through inlet passage 40.

As previously mentioned, the opposite end portions of the spool type valve elements are not provided with sealing means of any kind; it is the close sliding fit of said end portions in their cylindrical bores which limits the leakage of fluid past them (and it will in any case be understood that it can be assumed that the leakage will be roughly the same past each valve member so that the proportions of the liquids being metered is unlikely to be affected to any significant extent). Any leakage of fluid past the opposite end portions of the valve elements towards the push-rod portions is able to leak away through the passages 113 and 115. If the fluids concerned are relatively low cost fluids such as water, these leakages can be allowed to flow to a drain, but if the fluids are relatively expensive fluids, or hazardous in any way, then the leakages will be ducted back to the respective storage tanks concerned.

Depending on whether the fluids passing through the apparatus are of a particularly aggressive nature, the effectiveness of the sealing means 105 will need to be maintained, periodically, by the tightening of the annular screw members 111, the annular plugs 107 will need to be replaced by new ones at intervals. (It will be understood that this can be done relatively easily and at relatively less expense than would be the case if the sealing means had encircled the opposite end portions of the spool type valve elements). Although the sealing pressures surrounding the push-rod portions may need to be very high, the fact that said push-rod portions are of relatively small diameter means that the resulting frictional resistance to movement of the valve elements is less than would be the case if the sealing means surrounded the opposite end portions of said valve elements.

Thus there is provided a fluid flow proportioning device which is of relatively simple construction but yet highly efficient. Being of dual flow construction, that is to say being capable of controlling the flow of two different fluids, one against the other, the embodiment just described can be used, for example, in association with apparatus for spraying a two-part mix of materials and it will ensure the mix remains on ratio throughout the spraying operation. The device can, however, be used in a wide range of applications, either with high or low fluid pressures, and it will be understood that the device just described may be arranged so that the first and second fluid flows may be taken from a single fluid supply, the device then operating simply to divide the fluid into two or more flows in some fixed proportion to each other.

Referring now to FIGS. 7 to 12, these views illustrate a possible modification of the device described above, and one that has been found to be advantageous in smoothing fluid flow through the device. The modification simply involves the transposition of the inlet and outlet ports to the cylindrical bores 15 and 17 so that, when any spool valve element is displaced in one direction to uncover an inlet port, this results in the displacement of the next spool valve element in the opposite direction.

Figure 7:
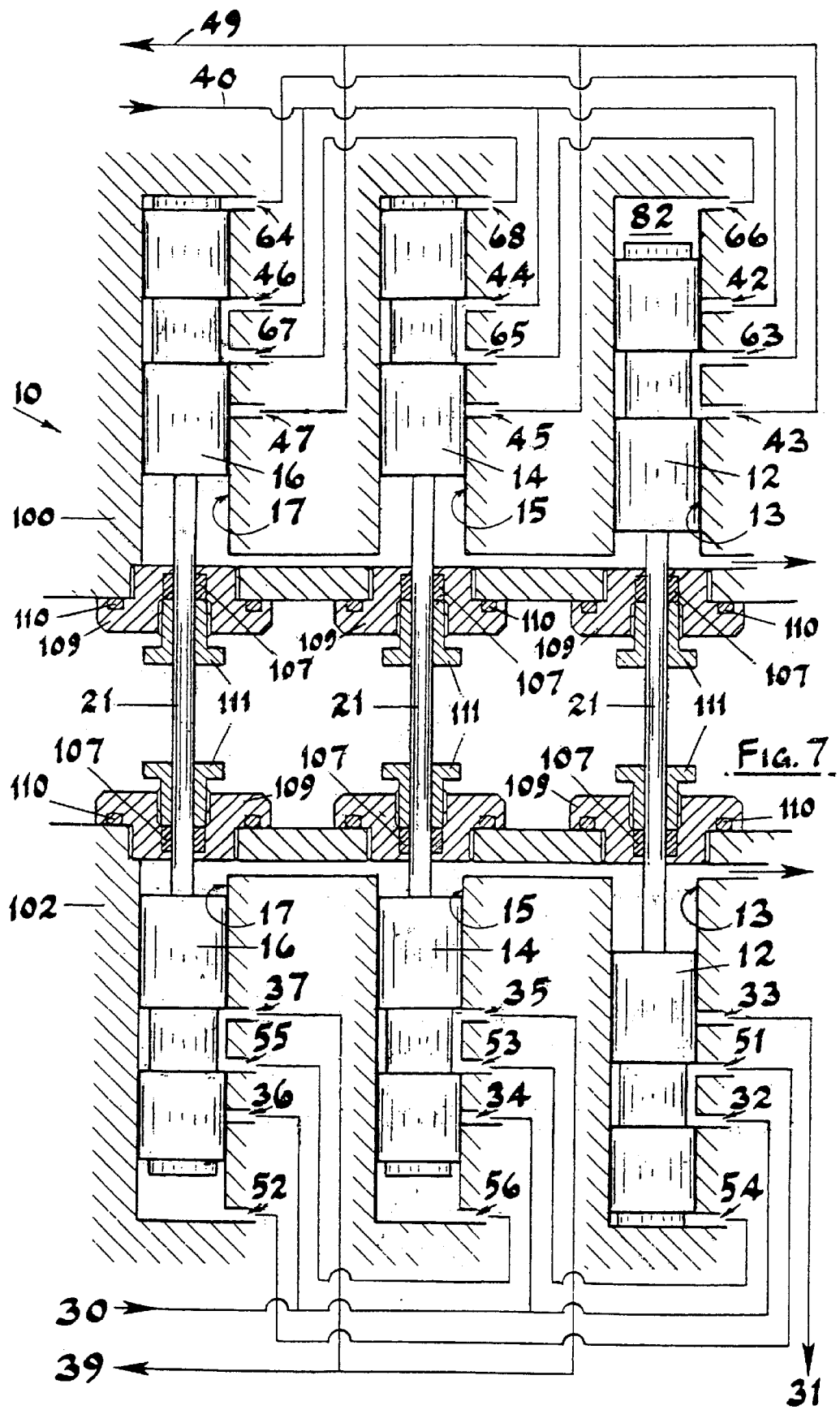
FIGS. 7 to 12 are views similar to FIGS. 1 to 6 which illustrate a possible modification of the device.

In operation of the modified device, the sequence of valve movements is as follows:

FIG. 7 the spool valve element 12 has just moved downwards to uncover inlet port 32 and this has opened ports 51 and 52 to inlet pressure from inlet 30 to act beneath spool valve element 16 and moved it upwards. (A first dose of fluid, from the second fluid flow, has been dispensed at 49 via ports 64, 63 and 45).

Figure 8:
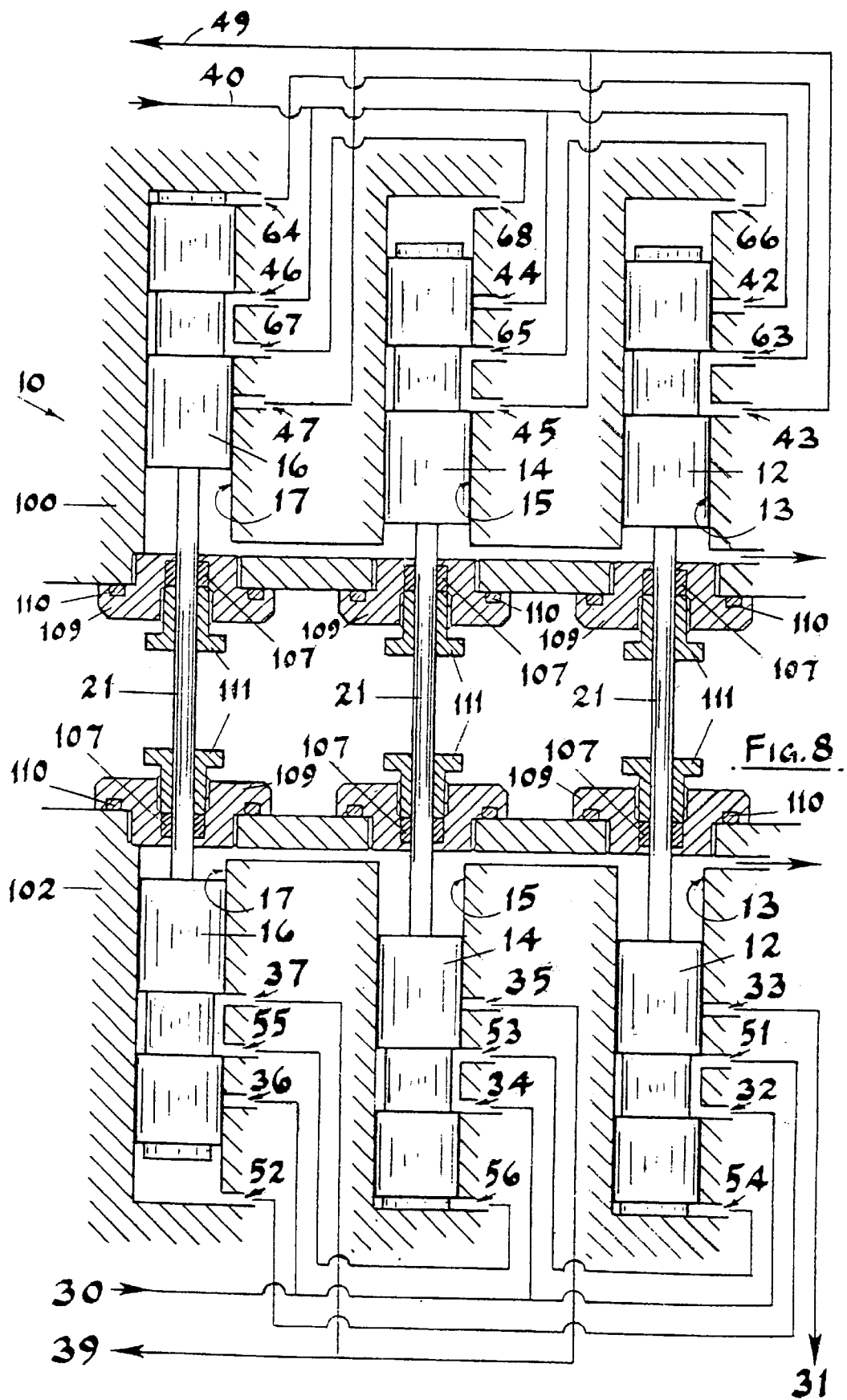

In FIG. 8 the upwards movement of spool valve element 16 has uncovered inlet port 46 and this has opened ports 67 and 68 to inlet pressure from inlet 40 to act on spool type valve element 14 and moved it downwards. (A second dose of the first fluid has been dispensed at 39 via ports 56,55 and 37).

Figure 9:
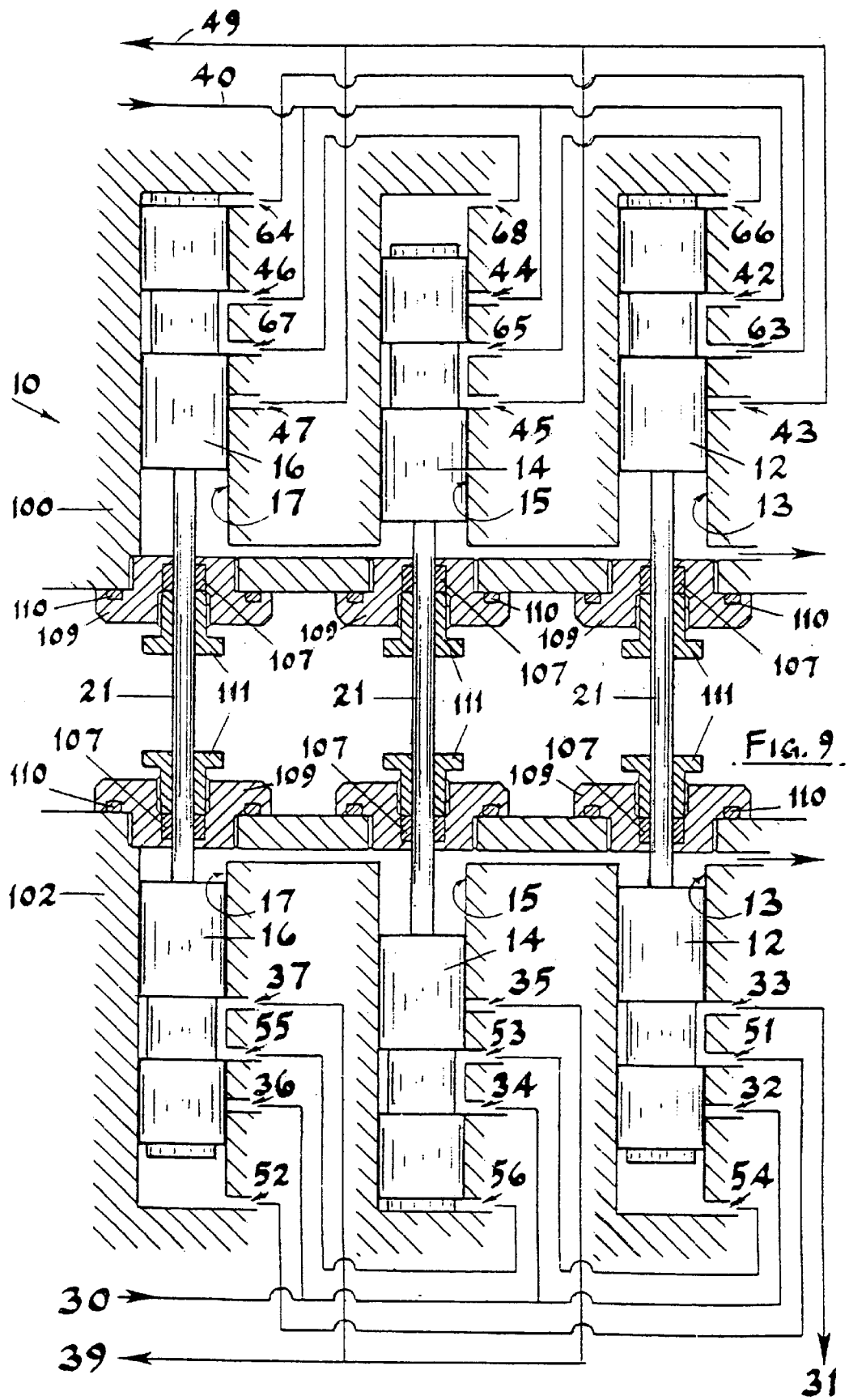

In FIG. 9 the downwards movement of spool valve element 14 has uncovered inlet port 34 and this has opened ports 53,54 to inlet pressure from inlet 30 to act on spool valve element 12 and moved it upwards. (A third dose of fluid, from the second fluid flow, has been dispensed at 49 via ports 66,65 and 45).

Figure 10:
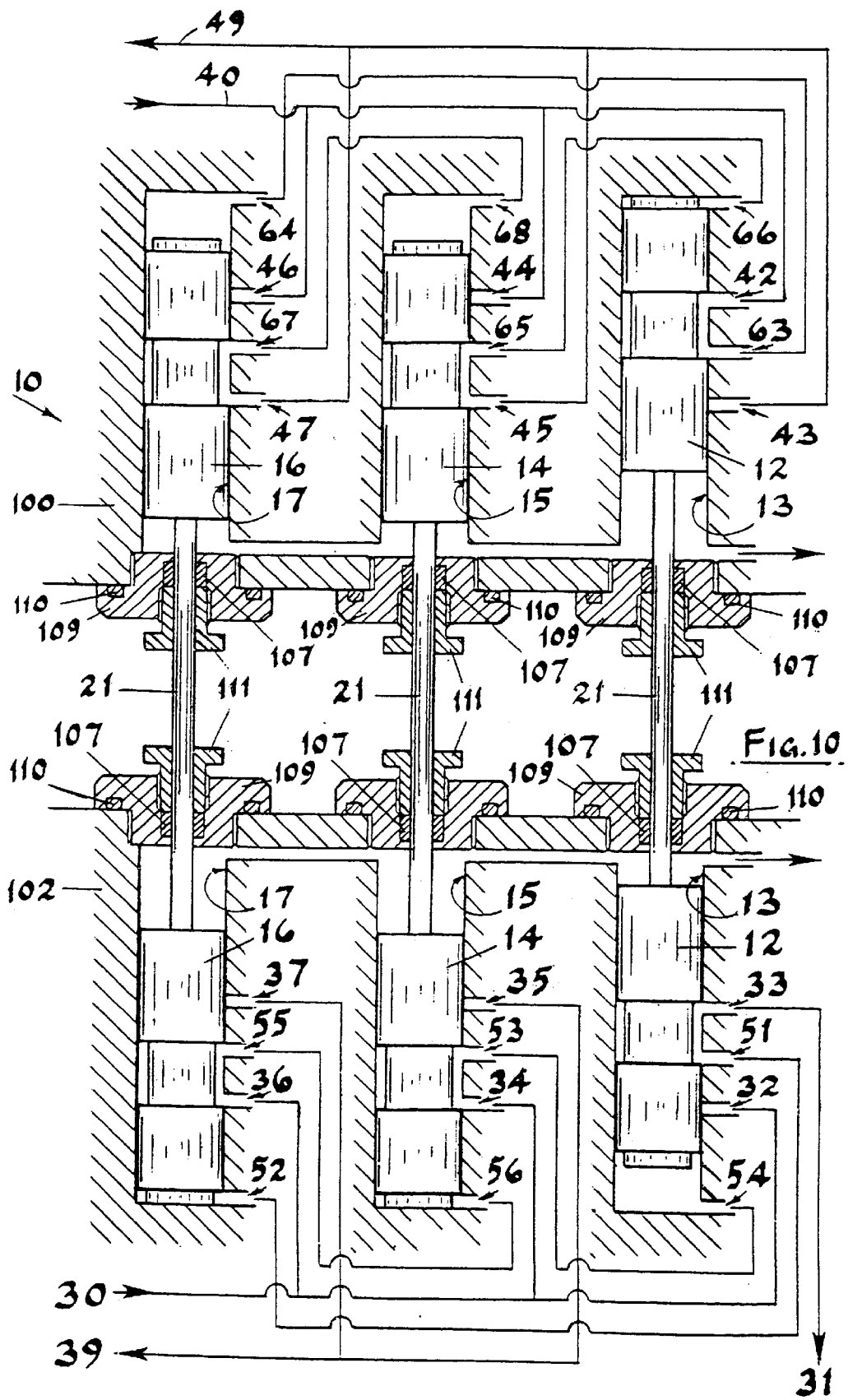

In FIG. 10 the upwards movement of spool valve element 12 has uncovered inlet port 42 and this has opened ports 63,64 to inlet pressure from inlet 40 to act on spool valve element 16 and moved it downwards. (A fourth dose of fluid, from the first fluid flow, has been dispensed at 31 via ports 52,51 and 33).

Figure 11:
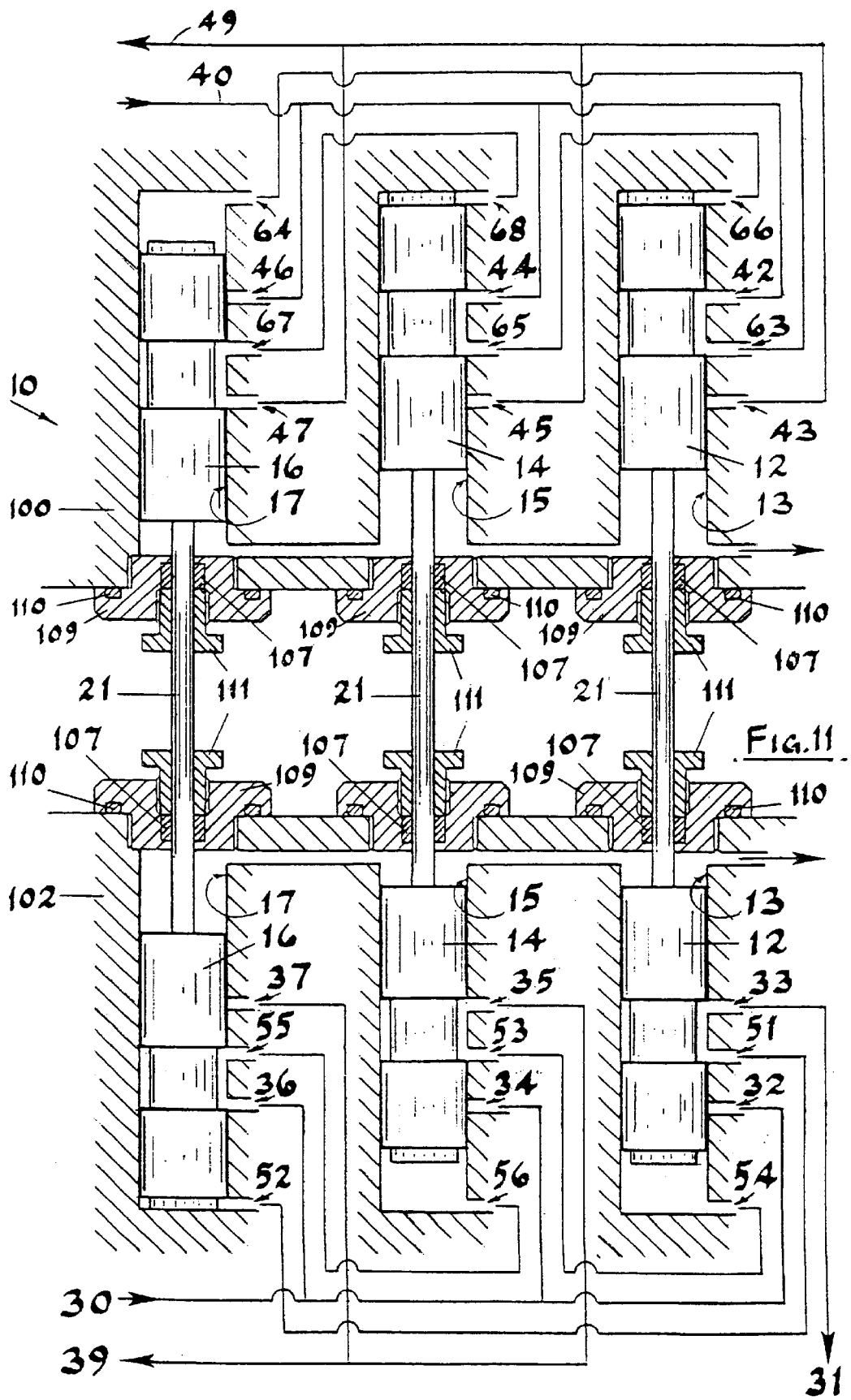

In FIG. 11 the downwards movement of spool valve element 16 has uncovered inlet port 36 and this has opened ports 55,56 to inlet pressure from inlet 30 to act on spool valve element 14 and moved it upwards. (A fifth dose of fluid, from the second fluid flow, has been dispensed at 49 via ports 68,67 and 47).

Figure 12:
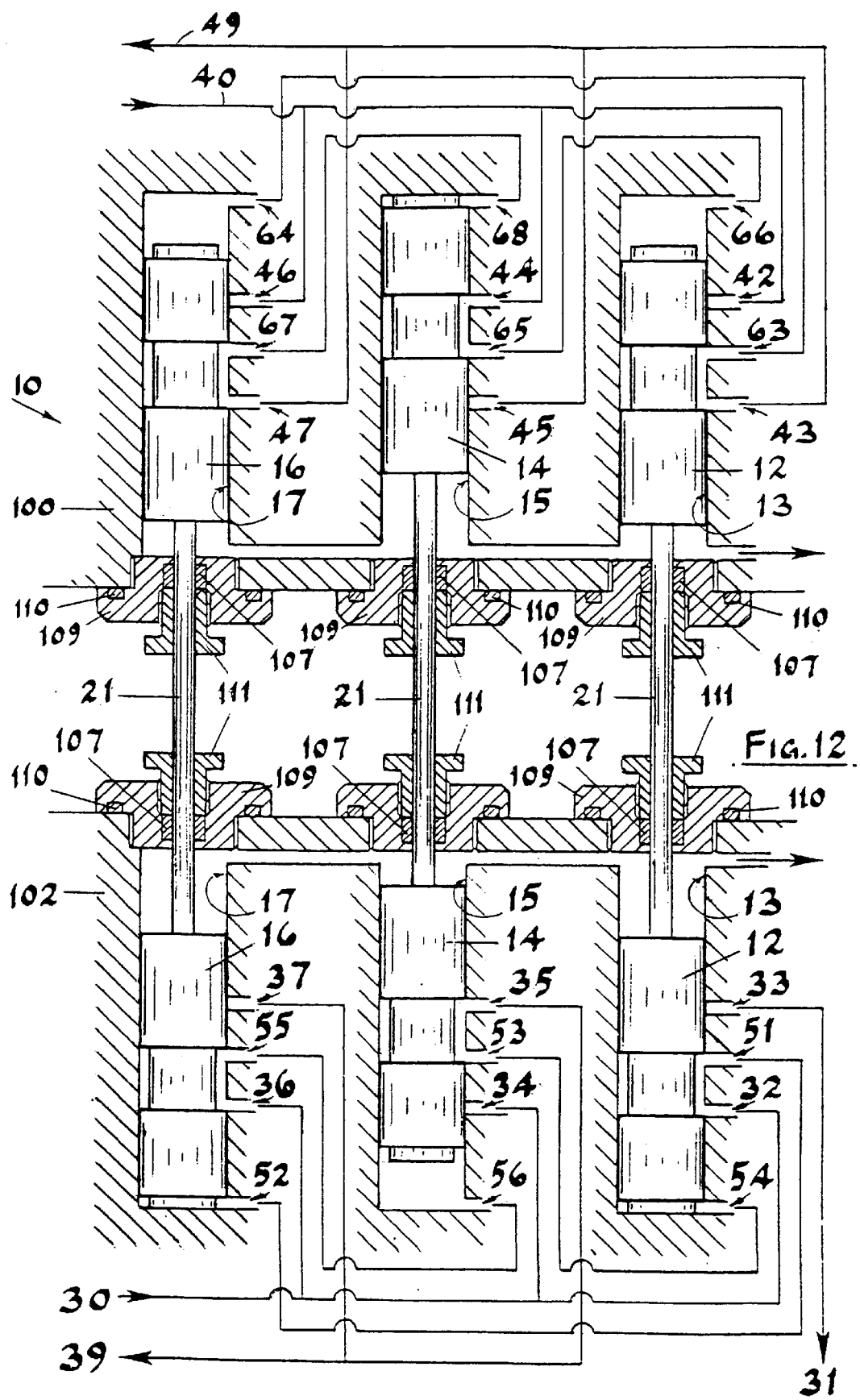

In FIG. 12 the upwards movement of spool valve element 14 has uncovered inlet port 44 and this has opened ports 65,66 to inlet pressure from inlet 40 to act on spool valve element 12 and moved it downwards. (A sixth dose of fluid, from the first fluid flow, has been dispensed at 39 via ports 54,53 and 35).

It will be understood that it is because the pressures of the first and second fluid flows are effective alternately to cause successive movements of the valve elements that this modification has the result of smoothing the fluid outputs from the device. In addition, it is though t that this modified device will remain exactly 'on ratio' in circumstances where the originally described device might develop small percentages of error.

Figure 13:
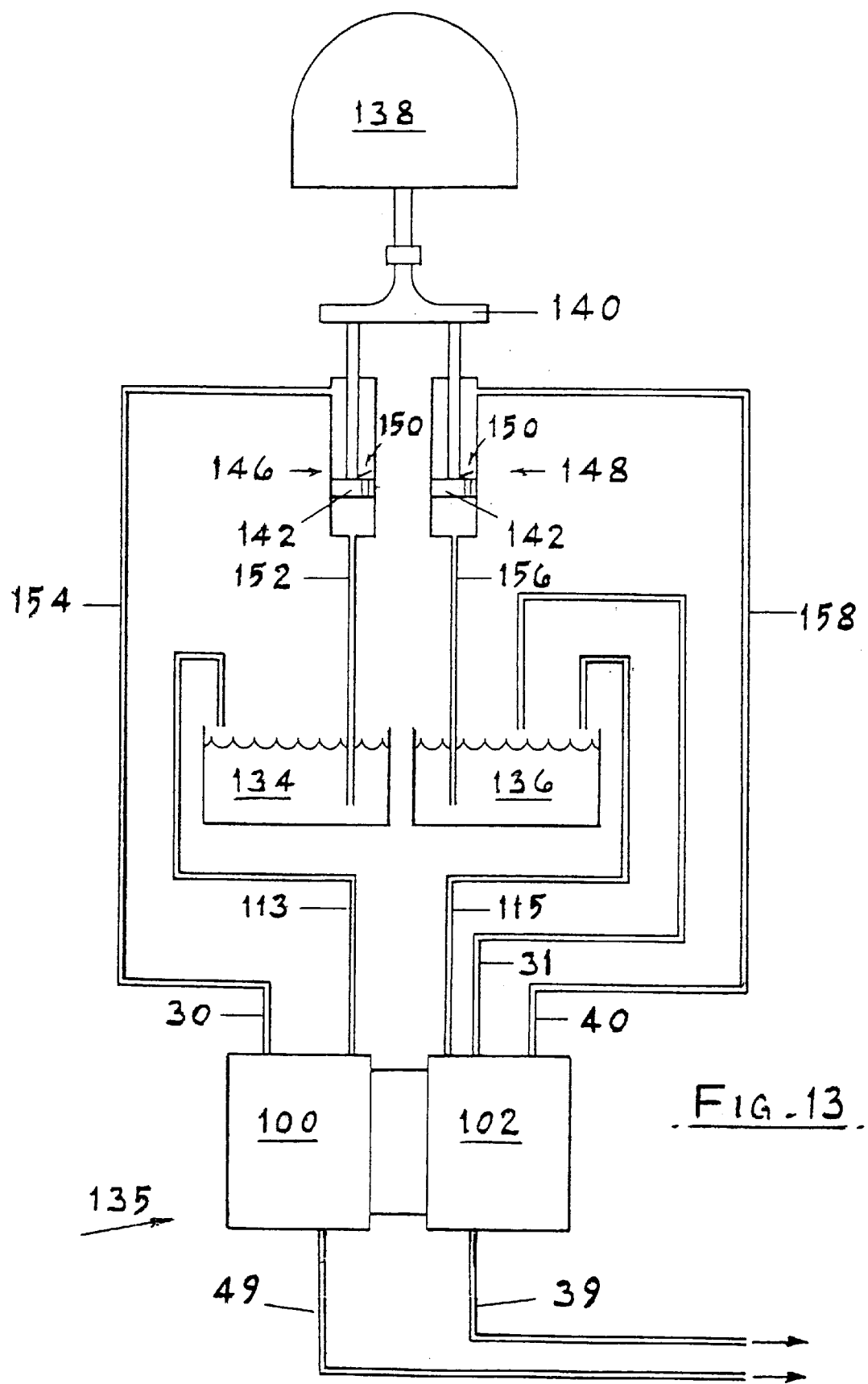
FIG. 13 is a diagrammatic illustration of how a device embodying the invention can conveniently be used for proportioning a two-part mix of materials such as a cold setting resin material and a liquid curing agent or initiator, FIG. 14, drawn to a larger scale than FIGS. 1 to 13, is a view which illustrates a further possible modification.

Referring now to FIG. 13, this illustrates the way in which a device embodying the invention, and generally indicated 135 (and operating in the manner of either one of those previously described) can be used for proportioning a two-part mix of materials, in this case a cold setting resin material from a tank 134 and a liquid curing agent or initiator from a tank 136. As shown, a reciprocating pump 138 is provided for raising the materials from the tanks and for feeding them to the respective valve block halves 100 and 102 of the proportioning device. The pump 138 includes a crosshead 140 to which the two pistons 142 and 144 of respective piston and cylinder arrangements 146 and 148 are connected. The two pistons include respective non-return valves 150 and the arrangement is such that, as the pump 138 reciprocates, the resin material is raised through conduit 152 and fed through conduit 154 to valve block half 100; simultaneously, the curing agent or initiator is raised through conduit 156 and fed through conduit 158 to valve block half 102.

As shown, passage 113 is arranged to convey leakages of fluid within the valve block half 100 back to tank 134. Similarly, passage 115 is arranged to convey leakages of fluid within the valve block half 102 back to tank 136. In this particular case, the output from common outlet passage 49 is the resin dispensed for mixing with the curing agent or initiator; the output from common outlet passage 39 is the curing agent or initiator dispensed for mixing with the resin, whilst the output from outlet passage 31 is being returned to tank 136.

Figure 14:
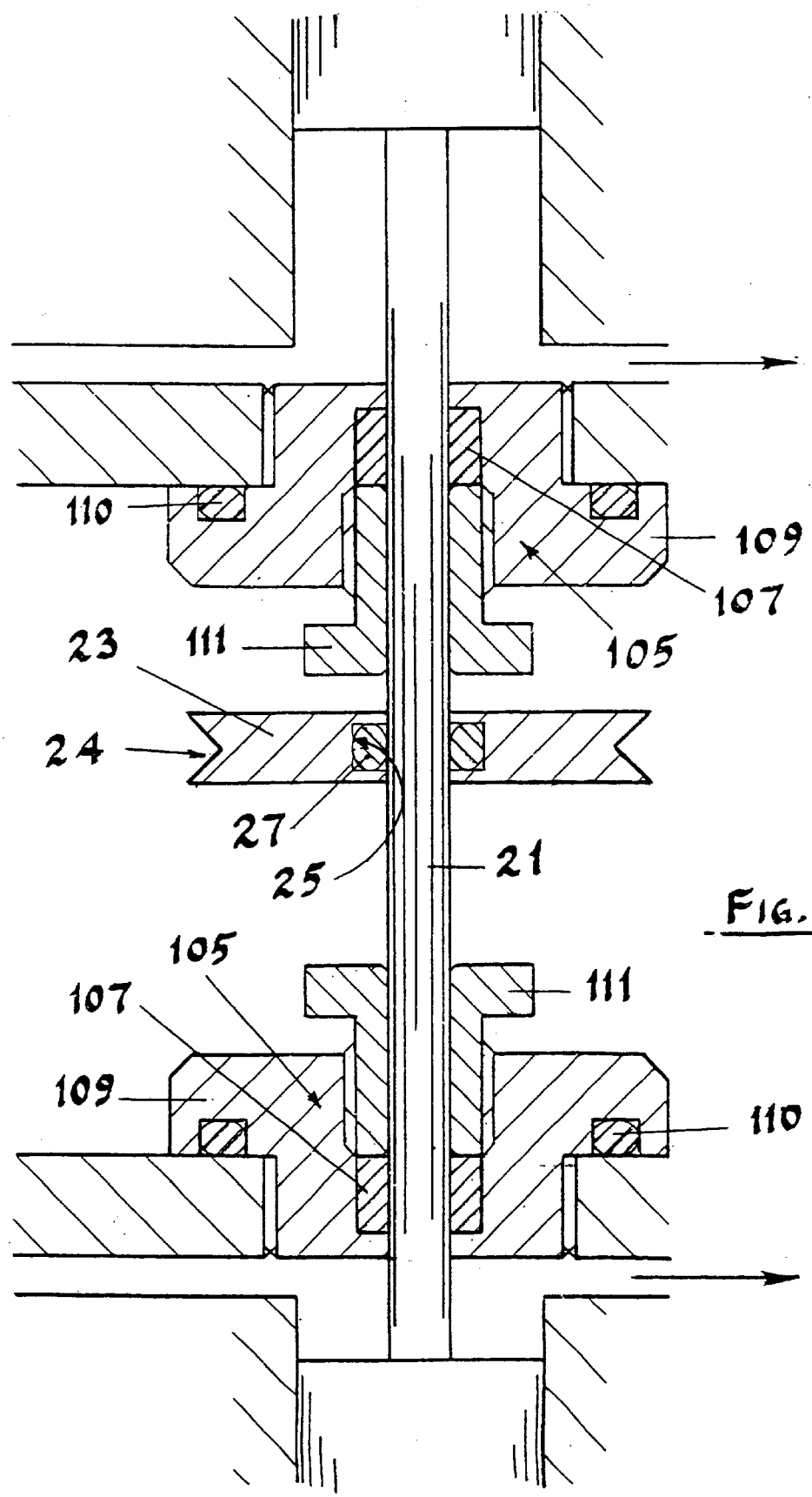

Referring now to FIG. 14, this illustrates a possible modification which can be made to either one of the previously described and illustrated embodiments of the invention, the modification involving the fitment of respective baffle plates 23 on the push-rod portions 21 of the valve elements. For ease of mounting, each baffle plate is provided with an undercut groove 25 within its central bore, said groove serving to accommodate a resilient O-ring 27. On assembly, since the O-ring is a push fit on the push-rod on which the baffle plate is to be mounted, the baffle plate can very easily be positioned as required on the pushrod concerned. It can, in addition, easily be removed whenever the apparatus needs to be stripped down for cleaning. As shown, each baffle plate is provided with a wide circumferential groove 24 at its periphery.

The purpose of the baffle plates is to prevent the mixing together of any small amounts of two different fluids which, after long use of the device, might possibly seep past the sealing means 105, which in some cases could be a serious matter. (For example, if the device is being used to meter the flow of the two constituents of a two-part spray coating material, the mixing together of any leakages could be serious because they could quickly combine to form a difficult to remove solid mass). Any seepage of fluids past the sealing means 105 can be cleaned up periodically; the circumferential groove at the periphery of each baffle plate ensures that any trickling of the fluids down the opposite faces of the baffle plate will not mix together at its periphery and any drips therefrom will be slightly spaced apart.

A device embodying the invention can have any number of spool type valve elements from three upwards, said elements being actuated in turn in the manner described, outlet ports being connected in whatever proportions are available to give the fluid mix required. For example, if four spool type valve elements are provided, the available ratios in which either one of the fluid flows can be split are 0.25:0.75, 0.5:0.5, and 0.75:0.25. If five spool type valve elements are provided, the available ratios in which either one of the fluid flows can be split are 0.20:0.80, 0.40:0.60, 0.60:0.40, and 0.80:0.20. It will of course be understood that in some instances it will be possible to split the flow of both fluids, that is to say by appropriately modifying the hydraulic connections from the respective pressure chambers to return a proportion of each fluid back to its respective storage tank, in order to obtain a required mix of the two fluids. Odd ratios could be achieved by changing the diameter of at least one valve element and/or providing means whereby the stroke of one or more of the valve elements can be adjusted.

Figure 15:
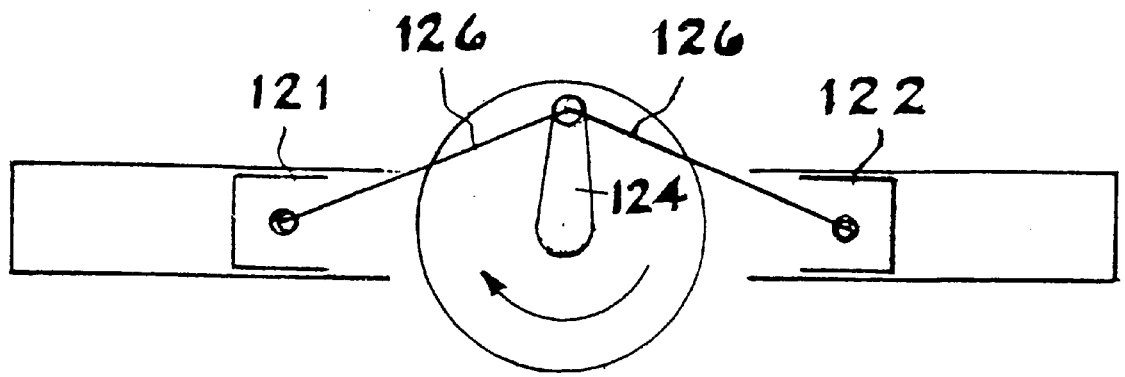

In FIG. 15 there is illustrated an arrangement in which a pair of oppositely disposed valve halves 121 and 122 (which together form one of the spool type valve elements) are connected to a crank 124 by means of respective connecting rods 126, this modification being intended for relatively high speed operation where the valve elements of the previously described embodiments would be likely to be damaged by impaction against the ends of their bores. In a modification of this last described embodiment, intended for use where the device is to control the flow of two different fluids at different pressures, the diameters of the valve halves will be different one from the other to compensate for the differences of pressure so that the valve element concerned will still be pressure balanced. To compensate for such different diameters, that is to say to ensure that the same volume of fluid is displaced on each movement of the valve halves, the latter could be linked together for simultaneous movement by means which control the length of stroke of each valve half in inverse proportion to its cross-sectional area, for example by the connecting rods 126 having an appropriately different throw about the crank 124.

Figure 16:
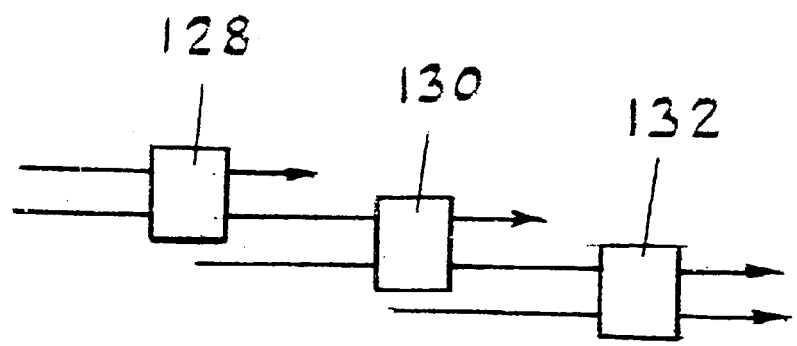

In FIG. 16, there is illustrated an arrangement in which three proportioning devices 128, 130 and 132, each embodying the invention, are linked together in series, an output from the device 128 being fed into the device 130, and an output from the latter being fed into the device 132. It will be understood that in this way the ratios obtained can be varied; also that other numbers of devices could be linked together in similar fashion to obtain other ratios.

Various other modifications may be made. For example, bores in which the spool type valve elements are slidably located could be formed in respective pairs of spaced apart cylindrical tubes, but it will be understood that in this case each oppositely disposed and spaced apart group of cylindrical tubes will constitute a valve block half as referred to in the following claims.

I claim:

1. A fluid flow proportioning device including at least three spool type valve elements slidably located in respective cylindrical bores to which there is connected a common inlet passage for a first fluid flow under pressure, by way of respective inlet ports, a common inlet passage for a second fluid flow under pressure, by way of other respective inlet ports, respective outlet ports being spaced from the inlet ports and respective transfer ports being provided whereby, in response to sequential movements of the valve elements, one of a pair of pressure chambers at the opposite ends of each valve element is fed in turn with one of the two fluid flows under pressure admitted via one of the two transfer ports of the previously actuated element whilst a measured volume of the other fluid flow is discharged, by the movement of the respective valve element, from the other of the pair of pressure chambers via the other transfer port of the previously actuated element, the arrangement being such that as the valve elements are actuated in turn, the proportions of the two fluid flows being delivered for use are dependent on the number of pressure chambers for each fluid flow which are connected for use, the respective cylindrical bores in which the valve elements are slidably located being formed in oppositely disposed and spaced apart valve block halves, and central portions of the spool type valve elements being of relatively small diameter, that is to say smaller than the diameters of the cylindrical bores in which the spool type valve elememts are slidably located, and having resilient seals where they extend outwards from the valve block halves.

2. A fluid flow proportioning device according to claim 1, in which each spool type valve element is constituted by two opposite end portions and the central portion comprising a push-rod portion abutting together end to end.

3. A fluid flow proportioning device according to claim 1, in which means are provided for intensifying pressure on the resilient seals which surround the central portions of the spool type valve elements.

4. A fluid flow proportioning device according to claim 1, in which provision is made for any leakage of fluid past the valve element in the cylindrical bore of the valve block half to be ducted back to a respective holding tank for the fluid concerned.

5. A fluid flow proportioning device according to claim 1, in which respective baffle plates are mounted on the central portions of said valve elements to prevent the mixing together of any leakage of fluids past the resilient seals.

6. A fluid flow proportioning device according to claim 1, in which the arrangement is such that, in operation of the device, the pressure of one fluid flow causes movements of the spool type valve elements, in turn, in one direction and the pressure of the other fluid flow then causes movements of said elements, in turn, in the opposite direction.

7. A fluid flow proportioning device according to claim 1, in which the arrangement is such that the pressures of the two fluid flows are effective alternately, that is to say, when the pressure of one fluid flow has caused the movement of one valve element in one direction, the pressure of the other fluid flow then causes the movement of a next valve element in the opposite direction.

8. A fluid flow proportioning device according to claim 1, for controlling the flow of two different fluids at different pressures, in which the opposite ends of the valve elements are of different diameters to compensate for the differences of pressure.

9. A fluid flow proportioning device according to claim 8, in which, to compensate for such different diameters, that is to say to ensure that the same volume of fluid is displaced on each movement of the valve element, each valve element is constituted by a pair of valve halves arranged to move through different distances, that is to say, being linked together for simultaneous movement by means which control stroke of each valve half in inverse proportion to its cross-sectional area.

* * * * *